(12) United States Patent
Embrey

(10) Patent No.: US 11,927,299 B1
(45) Date of Patent: Mar. 12, 2024

(54) TWO DISPLAY MONITOR MECHANISM

(71) Applicant: Randy Embrey, Frederick, MD (US)

(72) Inventor: Randy Embrey, Frederick, MD (US)

( * ) Notice: Subject to any disclaimer, the term of this patent is extended or adjusted under 35 U.S.C. 154(b) by 417 days.

(21) Appl. No.: 17/408,737

(22) Filed: Aug. 23, 2021

(51) Int. Cl.
*F16M 11/18* (2006.01)
*F16M 11/28* (2006.01)

(52) U.S. Cl.
CPC .............. *F16M 11/18* (2013.01); *F16M 11/28* (2013.01)

(58) Field of Classification Search
CPC ................................ F16M 11/18; F16M 11/28
USPC ........................................................... 312/294
See application file for complete search history.

(56) References Cited

U.S. PATENT DOCUMENTS

| | | | | |
|---|---|---|---|---|
| 4,725,106 A * | 2/1988 | Shields | .................. | A47B 21/02 312/196 |
| 6,612,670 B2 * | 9/2003 | Liu | ......................... | A47B 97/00 160/351 |
| 7,458,689 B2 * | 12/2008 | Head | ...................... | A47B 81/06 353/74 |
| 7,530,538 B2 * | 5/2009 | Whalen | .................. | F16M 13/02 108/50.01 |
| 7,878,470 B2 | 2/2011 | Oh | | |
| 8,009,412 B2 * | 8/2011 | Chen | ...................... | F16M 11/10 361/679.21 |
| 8,276,857 B2 * | 10/2012 | Cvek | .................. | F16M 11/2092 248/161 |
| 8,561,551 B2 * | 10/2013 | Whalen | .................. | F16M 11/10 108/50.01 |
| 8,783,193 B2 * | 7/2014 | Scharing | ................ | A47B 21/00 108/50.01 |
| 9,271,572 B2 * | 3/2016 | Fenelon | .................... | A47B 9/04 |
| 9,560,913 B2 * | 2/2017 | Scharing | .............. | F21V 23/007 |
| 9,631,769 B2 * | 4/2017 | McGowan | ........... | H02G 3/0418 |
| 10,278,494 B2 * | 5/2019 | Hollis | ..................... | A47B 81/06 |
| 10,350,748 B2 * | 7/2019 | Michael | ................ | B25H 3/026 |
| 10,619,789 B1 | 4/2020 | Copeland | | |
| 10,781,964 B2 * | 9/2020 | Yu | .......................... | F16M 11/42 |
| 11,311,106 B2 * | 4/2022 | Whalen | .................. | F16M 11/10 |
| 11,527,188 B2 * | 12/2022 | Seol | ........................ | G09F 11/16 |
| 11,622,626 B2 * | 4/2023 | Bradlee | .................. | F16M 11/10 312/29 |
| 11,745,081 B2 * | 9/2023 | Gibson | .............. | A63B 71/0622 248/125.9 |
| 2005/0045077 A1 * | 3/2005 | Bober | .................... | A47B 81/06 108/147 |

(Continued)

*Primary Examiner* — Daniel J Troy
*Assistant Examiner* — Timothy M Ayres
(74) *Attorney, Agent, or Firm* — Sanchelima & Associates, P.A.; Christian Sanchelima; Jesus Sanchelima

(57) ABSTRACT

A two display monitor mechanism including a stand assembly, a motorized arm assembly, and a mounting assembly is disclosed. These assemblies in conjunction with one another provide a simple solution to selectively concealing a secondary display behind a primary display. The stand assembly includes a stand having a primary display placed thereon. The motorized arm assembly includes a motorized arm with a second support plate to support a secondary display. The motorized arm assembly being disposed adjacent and at a spaced apart and parallel relationship with respect to the stand assembly. The motorized arm and the secondary display mounted thereon are then actuated via a remote between an up and down position. Thereby selectively concealing the secondary display behind the primary display.

1 Claim, 6 Drawing Sheets

(56) References Cited

U.S. PATENT DOCUMENTS

| | | | |
|---|---|---|---|
| 2005/0109892 A1* | 5/2005 | Bober | F16M 11/046 348/E5.128 |
| 2006/0076860 A1* | 4/2006 | Hoss | A47B 81/064 312/312 |
| 2006/0238086 A1* | 10/2006 | Lai | A47B 21/0073 312/319.5 |
| 2007/0252919 A1* | 11/2007 | McGreevy | F16M 11/28 348/825 |
| 2008/0018590 A1* | 1/2008 | Lin | A47B 21/0073 345/156 |
| 2009/0146039 A1* | 6/2009 | Liu | F16M 13/027 248/542 |
| 2011/0079688 A1* | 4/2011 | Grove | F16M 11/08 248/176.3 |
| 2013/0127306 A1* | 5/2013 | Head | A47B 81/06 312/204 |
| 2018/0055215 A1* | 3/2018 | Vander Park | A47B 21/02 |
| 2023/0255346 A1* | 8/2023 | Hazzard | F16M 11/046 248/226.11 |

* cited by examiner

TWO DISPLAY MONITOR MECHANISM

BACKGROUND OF THE INVENTION

1. Field of the Invention

The present invention relates to a two display monitor mechanism and, more particularly, to a two display monitor mechanism wherein one display monitor is selectively concealed behind a first display monitor.

2. Description of the Related Art

Several designs for a two display monitor mechanism have been designed in the past. None of them, however, include a display support stand for supporting two displays wherein one display is stowed in a concealed manner behind a first display and can be remotely controlled to lift vertically above the first television.

Applicant believes that a related reference corresponds to U.S. Pat. No. 7,878,470 issued for a motorized fully adjustable mount for a display screen or television. Applicant believes that another related reference corresponds to U.S. Pat. No. 10,619,789 issued for a remote controlled vertically adjustable stand for a flat panel television. None of these references, however, teach of a system for a two display monitor support stand wherein one display is mounted to a motorized arm that is stowed behind a first display to be lifted vertically via a remote to allow for simultaneous viewing of both displays.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a two display monitor mechanism that includes a secondary display mounted to a motorized arm concealed by a primary display.

It is another object of this invention to provide a two display monitor mechanism that includes a remote to control the actuation of the motorized arm.

It is still another object of the present invention to provide a two display monitor mechanism that allows for the selective simultaneous viewing of both displays.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
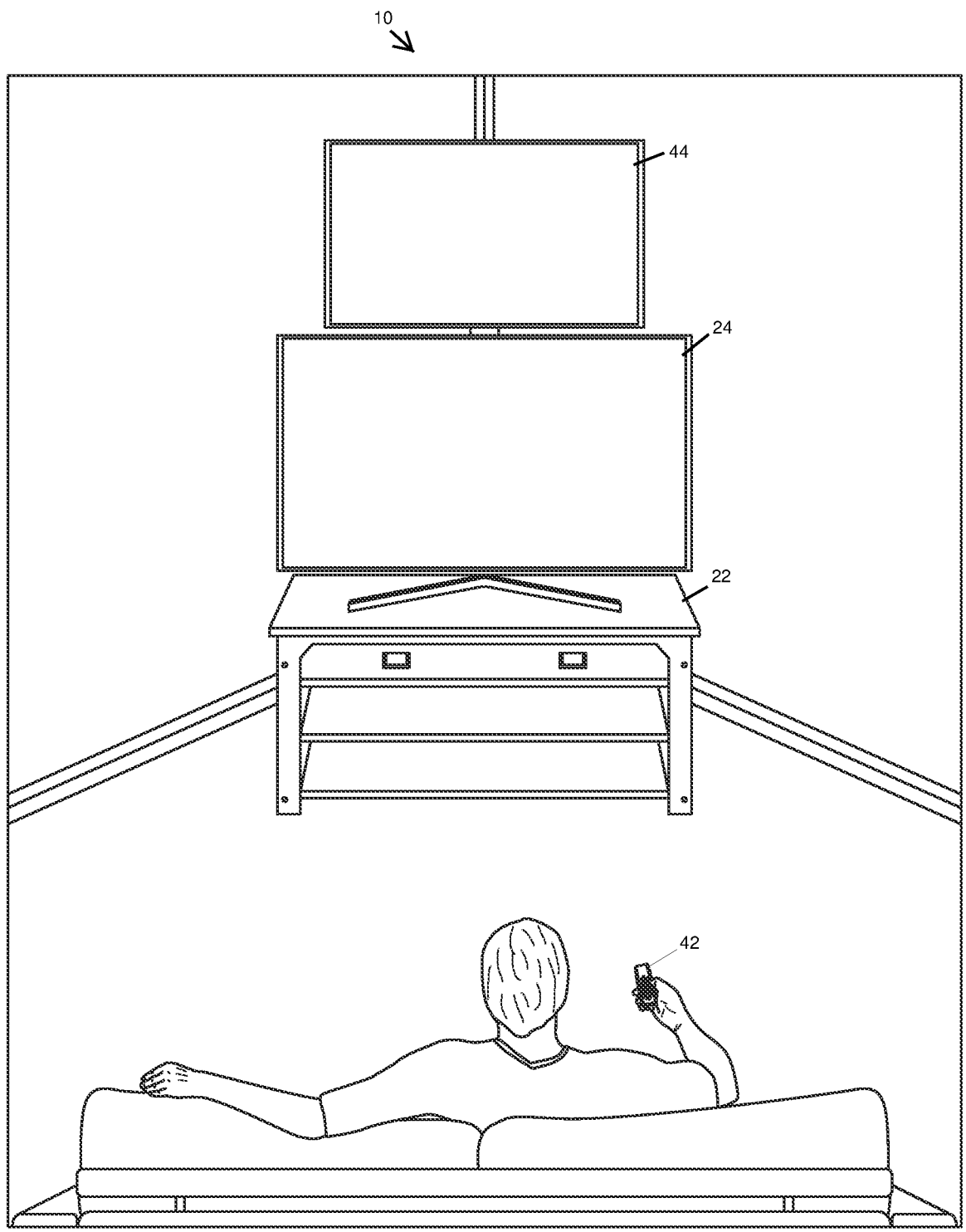
FIG. 1 represents an operational view of the present invention 10. Wherein a user is shown operating a remote 42 to elevate the secondary display 44 above the primary display 24. The primary display 24 is shown placed atop of stand 22. Thereby achieving a viewing position for the secondary display 44.

Referring now to the drawings, where the present invention is generally referred to with numeral 10, it can be observed that it basically includes a stand assembly 20, a motorized arm assembly 40, and a mounting assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
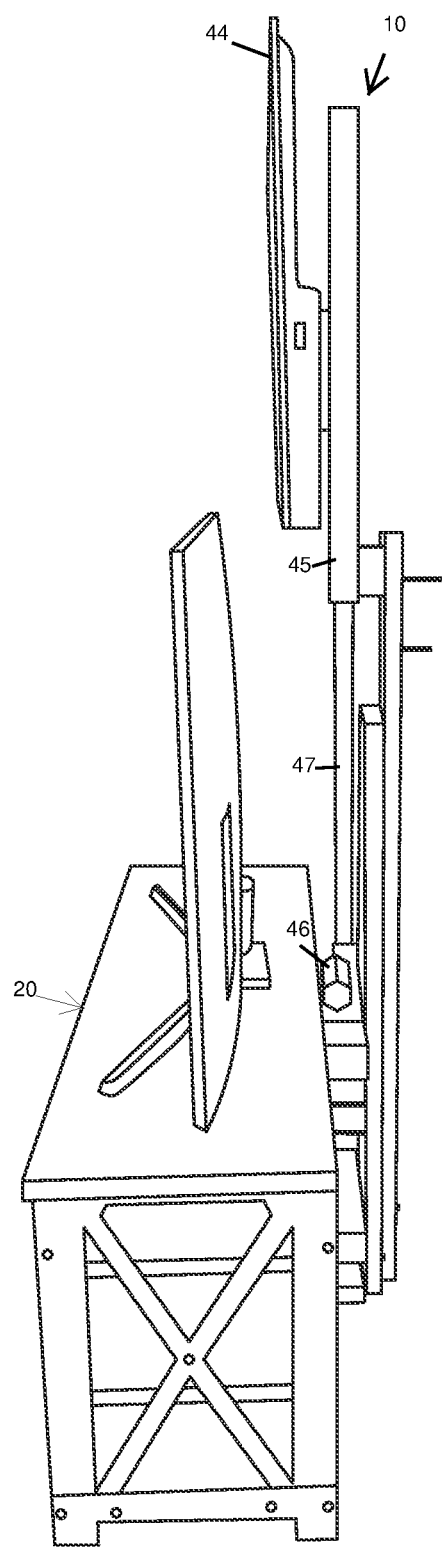
FIG. 2 shows a side view of the present invention 10 with the secondary display 44 raised into a viewing position.
Figure 3:
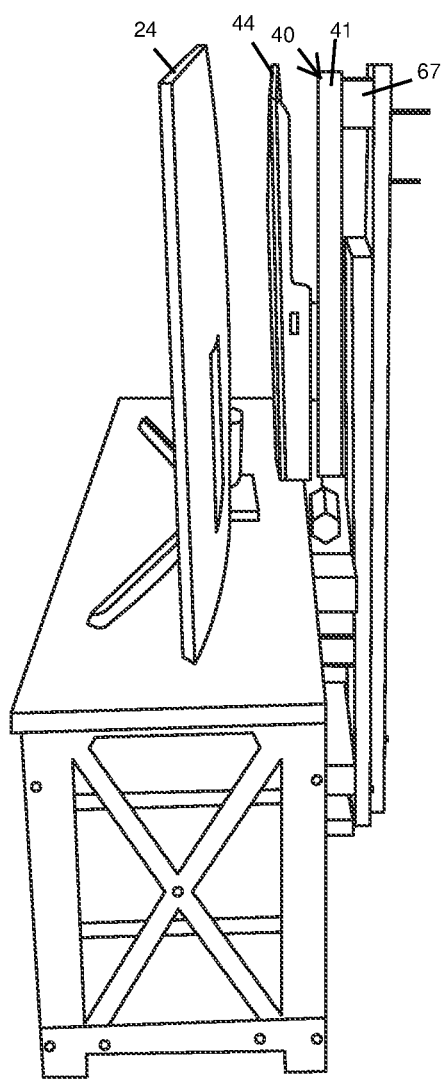
FIG. 3 illustrates a side view of secondary display 44 in a concealed position behind the primary display 24.

Best illustrated in FIGS. 1-3 stand assembly 20 may include a stand 22. The stand 22 may be a substantially horizontal support member with a flattened rear portion. The stand 22 may be rectangular with a flat top surface to facilitate placing a primary display 24 thereon. It may be suitable for the stand 22 to include shelving or drawers for storage of devices that function with the primary display 24. The stand may also help conceal power and display cables that are used to operate the primary display 24. The primary display 24 may be a computer, a monitor, a television, or any variation thereof. The primary display 24 may be any device used for visual media consumption. In one embodiment the primary display 24 may include a substantially flattened viewing portion and rear portion. The flattened portions of the primary display 24 may allow for better concealment and smoother movement of the motorized arm assembly 40 while the motorized arm 41 is in operation.

As shown in FIG. 3 the motorized arm assembly 40 may include a motorized arm 41. In one embodiment the motorized arm assembly 40 may comprise a Vivo model Mount-E-UP44 motorized stand for TVs manufactured in Dongguan, China. Wherein the motorized arm 41 may include a bottom end wherein the bottom end is located adjacent to a stand top edge and perpendicularly mounted with respect to the flat top surface of the stand 22. The motorized arm 41 may mounted to the flattened rear portion of the stand 22 via mounting assembly 60. Referring now to FIG. 2 the motorized arm 41 may further include a slidable portion 45. The slidable portion 45 may be a rectangular member slidably mounted to a track 47. Located on the bottom portion of the track 47 may be a motor 46. Wherein the motor 46 may be actuated wirelessly via a remote 42. The remote 42 may comprise a housing including programmable buttons mounted thereon to actuate the motor 46 and by extension the slidable portion 45 of the motorized arm 41. Upon actuation of the motor 46 the slidable portion 45 may forcibly travel longitudinally along the track 47.

Shown in FIG. 2 the slidable portion 45 can be seen in a viewing or raised position. Located along the lateral interior edges of the slidable portion 45 may be a support plate having a series of openings to help facilitate mounting the secondary display mount 43 thereon. The secondary display mount 43 may be a flattened rectangular member perpendicularly mounted to the slidable portion 45. The series of openings on the slidable portion may allow for a vertical mounting position of the secondary display mount 43 to be varied. A height of the secondary display mount 43 may be selected by a user depending on the height of the secondary display 44. In one embodiment the secondary display 44 may be a computer, a monitor, a television, or any variation thereof. The secondary display 44 may also include any variation of devices used for visual media consumption. It may be preferable for the secondary display 44 to include a substantially flattened viewing portion and rear portion.

Referring now to FIG. 3 a primary display 24 on the top surface of the stand 22. Located directly behind the primary display 24 may be the motorized arm 41 with the secondary display 44 mounted thereon. The flattened rear portion of the primary display 24 and the flattened viewing portion of the secondary display 44 may help facilitate placing said secondary display 44 into a concealed position or, as shown in FIG. 2, into a viewing position.

Best depicted in FIGS. 3-6 the motorized arm assembly 40 may be secured to the stand assembly 20 via the mounting assembly 60. The mounting assembly 60 may include a frame support 62. The frame support 62 may be a vertical member including a bottom edge that is coplanar with a bottom edge of the stand 22. The frame support 62 may be secured to a rear face of the stand 22 via fasteners 68. Located between the frame support 62 may be a base member 63. The base member 63 may be a horizontally oriented rectangular member with a bottom edge flush with a frame support bottom edge. Located above the base member 63 may be a lower support member 64.

Figure 4:
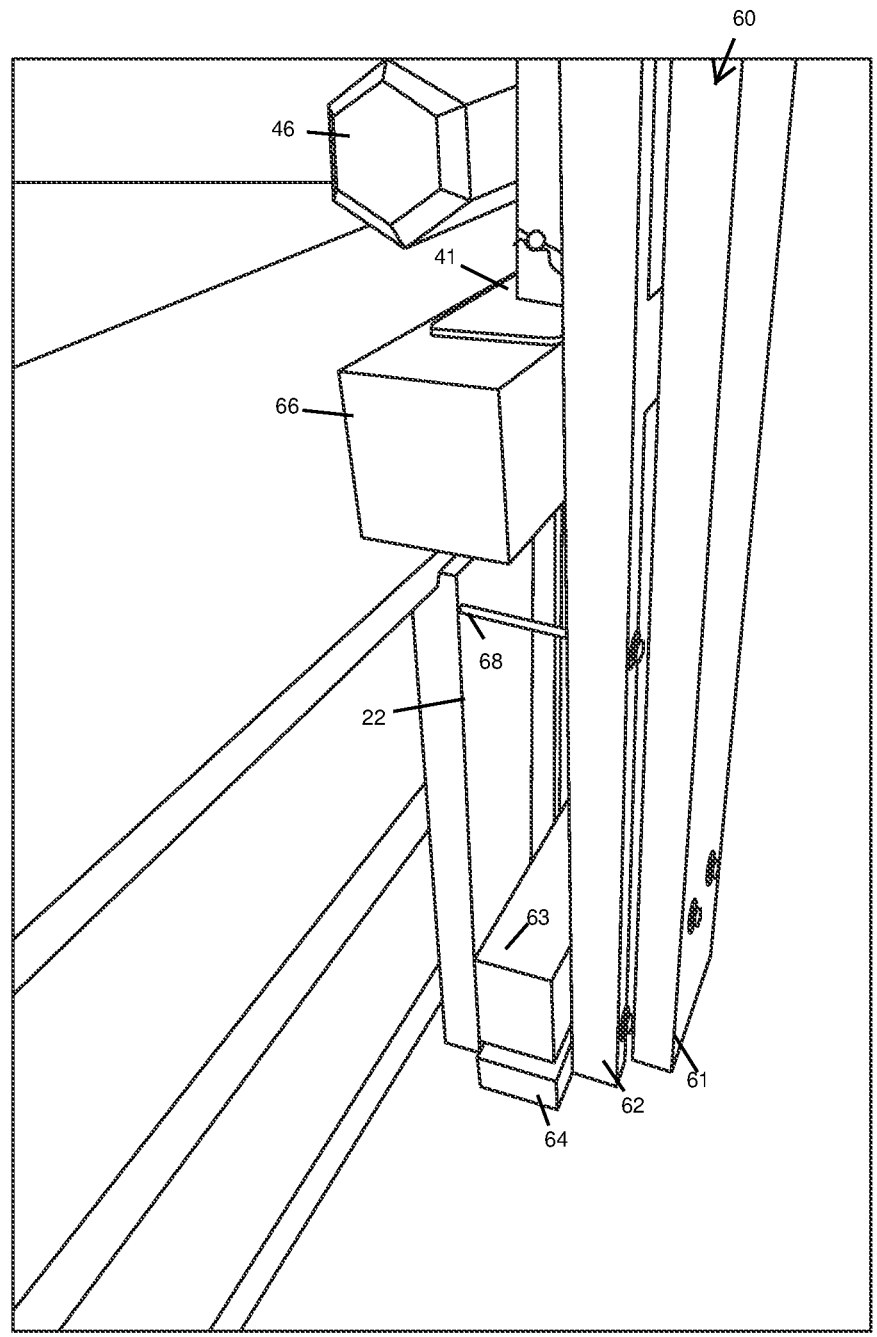
FIG. 4 is a representation of an enlarged view of the bottom portion of the mounting assembly 60. Wherein the vertical support 61 is shown to be secured to a rear face of the stand 22 via fasteners 68. The fasteners 68 perpendicularly traversing the vertical support 61 and the frame support 62.
Figure 5:
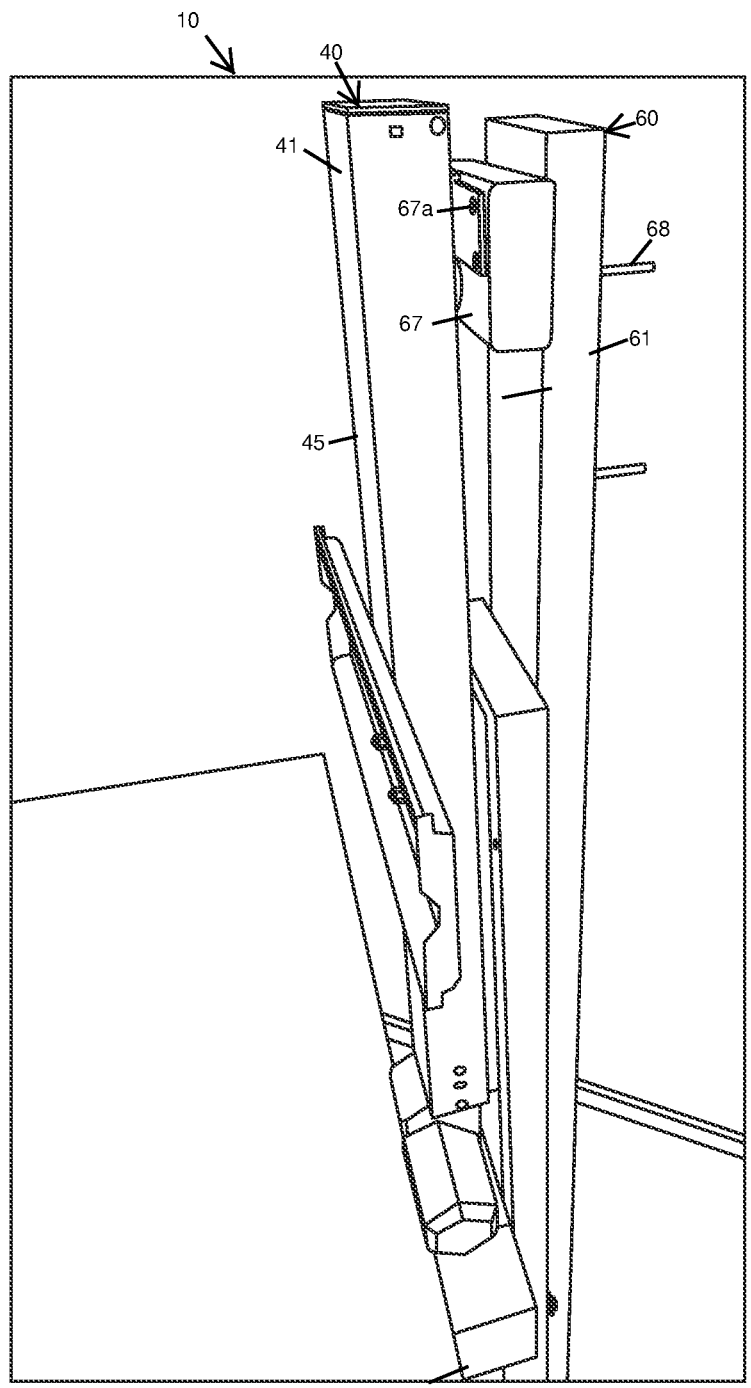
FIG. 5 depicts an enlarged view of the upper portion of the mounting assembly 60. The top portion of the motorized arm assembly 40 is secured to the upper support member 67 via upper support fasteners 67A. The upper support member 67 is in turn secured to the vertical support 61 using one of the fasteners 68.
Figure 6:
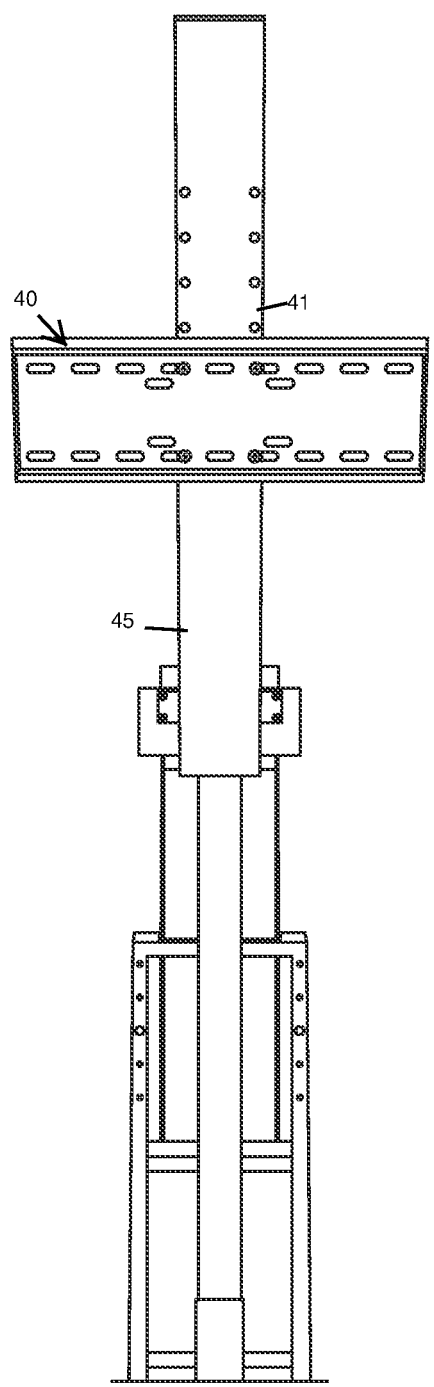
FIG. 6 is a front view of the motorized arm assembly 40 in an elevated or viewing position.

Referring now to FIG. 4 located at a base portion of the motorized arm 41 may be a mid support member 66. The mid support member 66 may be perpendicularly mounted with respect to the frame support 62. The mid support member 66 may be located entirely between the frame support 62 and the rear face of the stand 22. The mid support member 66 may provide added support to help distribute the weight of the motorized arm assembly 40 more evenly throughout the mounting assembly 60. The mounting assembly 60 may further include an upper support member 67 as shown in FIG. 5. The upper support member 67 may serve as a mounting point for a top end of the motorized arm 41 to be secured thereon. It may be suitable for the top end of the motorized arm to be secured to the upper support member 67 via upper support fasteners 67A. The mounting assembly 60 may include a vertical support 61. It may be suitable for the vertical support 61 to be a rectangular member that extends from the base of the frame support 62 to top edge of the motorized arm assembly 40. The vertical support 61 may be parallel and in abutting contact to the frame support 62. The vertical support 61 may provide a rear support to the mounting assembly 60 and help prevent the secondary display 44 from falling over when the motorized arm 41 is actuated. The vertical support 61 may be fastened to the rear face of the stand 22 via fasteners 68. The fasteners 68 may be threaded members that traverse the vertical support 61 and frame support 62 perpendicularly to engage both with the rear face of the stand 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a two display monitor mechanism, consisting of:
   a) a stand assembly including a stand configured to have a primary display mounted thereon, said stand assembly resting on a substantially horizontal support surface;
   b) a motorized arm assembly including a motorized arm with a support plate to receive a secondary display, wherein said motorized arm assembly is disposed adjacent and at a spaced apart and parallel relationship with respect to said stand assembly, said motorized arm travels within two predetermined extreme vertical positions, wherein said motorized arm assembly includes a slidable portion mounted to a track, said slidable portion is slidable along said track, wherein said slidable portion is slid along said track by a motor; and
   c) a mounting assembly including a frame support, a mid support member and a vertical support to secure the motorized arm assembly to the stand assembly, said frame support is a vertical rectangular member, said frame support is secured to a rear face of the stand via fasteners, said vertical support extends from a base of the frame support to a top edge of the motorized arm assembly, said vertical support parallel and in abutting contact to the frame support, said vertical support is fastened to the rear face of the stand, said mounting mid support member is located between a top portion of the rear face of the stand and the frame support, said mid support member having the motorized arm assembly mounted thereon, said mounting assembly also includes an upper support member to mount a top end of the motorized arm thereon, said upper support member is fastened between said slidable portion and said vertical support.

\* \* \* \* \*